US010473347B2

(12) United States Patent
Sugiyama

(10) Patent No.: US 10,473,347 B2
(45) Date of Patent: Nov. 12, 2019

(54) METHOD AND APPARATUS FOR COMMANDING TEMPERATURES TARGETED BY AIR CONDITIONER

(71) Applicant: DENSO WAVE INCORPORATED, Chita-gun, Aichi-pref. (JP)

(72) Inventor: Wataru Sugiyama, Anjo (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 130 days.

(21) Appl. No.: 14/715,163

(22) Filed: May 18, 2015

(65) Prior Publication Data
US 2016/0084517 A1 Mar. 24, 2016

(30) Foreign Application Priority Data

May 19, 2014 (JP) .................................. 2014-103279

(51) Int. Cl.
| G05D 23/12 | (2006.01) |
| G05D 23/185 | (2006.01) |
| F24F 11/30 | (2018.01) |
| G06F 3/0488 | (2013.01) |
| G06F 3/0486 | (2013.01) |
| G06F 3/0484 | (2013.01) |
| F24F 11/52 | (2018.01) |

(52) U.S. Cl.
CPC ............ *F24F 11/30* (2018.01); *G06F 3/0486* (2013.01); *G06F 3/0488* (2013.01); *G06F 3/04847* (2013.01); *F24F 11/52* (2018.01)

(58) Field of Classification Search
CPC .. F24F 2011/0073; F24F 11/523; F24F 11/61; F24F 11/30; F24F 11/52; F24F 2110/10; G06F 3/04847; G06F 3/0486; G06F 3/0488; G06F 3/0482; G05B 15/02
See application file for complete search history.

(56) References Cited

U.S. PATENT DOCUMENTS 8,387,891 B1 * 3/2013 Simon ................. G05D 23/1904
236/46 R
9,152,320 B2 * 10/2015 Roddy ................. F24F 11/0086
(Continued)

FOREIGN PATENT DOCUMENTS

JP S55-107849 A 8/1980
JP 2000146271 A 5/2000
(Continued)

Primary Examiner — Edward F Landrum
Assistant Examiner — Kamran Tavakoldavani
(74) Attorney, Agent, or Firm — Oliff PLC

(57) ABSTRACT

On the screen of a display unit, period border lines are displayed. The period border lines divide hours (for example 24 hours) for a user's desired one day into a plurality of periods and present line segments movable on the screen in a predetermined direction. Each of the line segments acts as a border lien between mutually adjacent periods. On the screen, target temperatures which are set for the respective periods are also displayed. Dragging the period border liens (K1 to K4) so as to move on the screen makes it possible to move a start time and a stop time of mutually adjacent periods are changed simultaneously. In addition to this change, target temperatures which were set before the change are reset for changed periods.

10 Claims, 13 Drawing Sheets

(56) References Cited

U.S. PATENT DOCUMENTS

2010/0107070 A1* 4/2010 Devineni ............ B60H 1/00985
715/702
2012/0260166 A1   10/2012 Cipollo et al.
2013/0345882 A1   12/2013 Dushane et al.

FOREIGN PATENT DOCUMENTS

JP   2012008721 A   1/2012
JP   2013-011983 A   1/2013

* cited by examiner

METHOD AND APPARATUS FOR COMMANDING TEMPERATURES TARGETED BY AIR CONDITIONER

CROSS-REFERENCE TO RELATED APPLICATION

This application is based on and claims the benefit of priority from earlier Japanese Patent Application No. 2014-103279 filed on May 19, 2014, the description of which is incorporated herein by reference.

BACKGROUND

1. Technical Field

The present disclosure is related to an operation apparatus and method to command a target temperature for an air conditioning apparatus. Specifically, the air conditioner system is related to an apparatus and method that is particularly suitable for a central heating system, using a touch panel for operation.

2. Related Art

The air conditioning apparatus usually performs a cooling operation and a heating operation so that the detected temperature detected by a sensor, for example, reaches the target temperature set by the user. There are also various types of air conditioning available, however, when employing a central heating-system type air conditioner, a 24 hour operation can be achieved depending on the area. Thus, for the air conditioner apparatus, it is required that one day is divided into a plurality of periods and a target temperature is set corresponding to each period.

For this kind of temperature setting a plurality of settings are required and it is necessary to perform an individual setting for each corresponding period, in a configuration, for example, where the period and temperature is shown as a figure and a change button is provided to change each respective period and target temperature individually. Specifically, in a configuration, for example, where the temperature setting is changeable by one degree, if it is desired to change the temperature by 5 degrees then it is necessary to carry out the operation 5 times. Also, in a configuration where the period is changeable, for example, at 15 a minute interval, when it is desired to change a period by 2 hours, it is then necessary to perform the operation 8 times. Since this kind of control operation is complicated and the usability deteriorates, the Japanese Patent Laid-open No. 2000-146271 proposes setting a target temperature by designating the position on the screen using a touch activating means.

Incidentally, when setting the target temperature for a particular period, according to the Japanese Patent Laid-open No. 2000-146271, for example, if the time axis is in the horizontal direction, it is thus necessary to operate the cursor accurately in the horizontal direction.

However, it can also be desirable to miniaturize the operation apparatus and it is not usually possible to increase the size of the screen of the display, when considering a typical household using the apparatus. If the screen is small, in order to adjust the target temperature to the desired target temperature it can be difficult to continuously select the position on the screen precisely, and the longer the operation time is, the worse the controllability appears. If the division of the periods are different for each day, each time the settings of a period is changed it is also necessary to reset the target temperature and therefore usability deterioration becomes unavoidable.

In addition, if we consider the case where the user operating the operation apparatus is a child or a senior person, for example, it is very important that the usability is improved so that an erroneous control is avoided.

SUMMARY

Considering the circumstances mentioned above, it is desirable to provide an operation apparatus for an air conditioner with reliable usability, high controllability, and in which a desired period and a desired target temperature for the period can be set simply and accurately.

A typical example of an air conditioning apparatus and operating method to command a target temperature of the air conditioning apparatus includes a display unit, a touch panel corresponding to a display of the display unit, and a controller controlling the display of the display unit to correspond to the control inputted into the touch panel. For this particular apparatus and method, the user's desired time in one day (for example 24 hours, or even less than 24 hours) is divided into several time periods, and there is a dividing line segment serving as a border line between two adjacent periods, that is a period border line movable in a predetermined direction on a screen, and a target temperature set for each designated period displayed on the screen of a display unit. The start and stop time of an adjacent time period is simultaneously changed by dragging to move the period border line. Since by dragging a period can be changed therein, even if the configuration is such that the period is changeable at a 15 minute interval, it is not necessary to use the control button several times and therefore the change can be achieved simply.

In this configuration, since the configuration is such that a period border line is movable in a predetermined direction, even if the user's finger is unsteady when dragging, the period border line can still be accurately moved. In the case of, for example, a child or elderly person, the controlling therein can be easily achieved and the possibility of an erroneous control can also be decreased, therefore the usability of the air conditioning and air conditioning apparatus is improved.

In the case of, for example, changing the stop time of a particular period, then the start time of another period that is adjacent from the time point of view is also simultaneously changed, therefore a plurality of periods are simultaneously changed by a single drag, and since the target temperature for a period before the change is automatically reset for the period after the change, that is, when the settings for a period are changed the target temperature is also changed accordingly, thus it is not necessary to reset the target temperature separately and the usability is improved.

In this case, the air conditioner operation apparatus is not necessarily configured so that the period border line itself is moved. The air conditioning apparatus may be configured, such that the period border line is indirectly moved by dragging a control mark, which is connected to the period border line.

In the above example, the dividing line segment is a line indicating the target temperature set for each period, for example. The target temperature lines that are movable in an orthogonal direction from the period border lines, are shown on the screen of the display unit and the target temperature lines may be dragged in order to move therein. Hence, the target temperature for a period can be changed by moving the corresponding target temperature line. Since the target temperature can be changed by a single drag, for example, even if the target temperature is set on a one degree scale it is not necessary to operate the control button several times. Since the motion for the control input is continuous, the target temperature can be moved by a single control and only a small amount of operation is needed to set the target temperature, therefore the target temperature can be simply changed.

As the air conditioning apparatus is configured such that the target temperature lines are able to move in an orthogonal direction from the period border lines, the possibility of erroneously moving the period border lines when moving the target temperature lines, or in contrast, of moving the target temperature lines when moving the period border lines is avoidable, and the controllability and usability improved. In this case, the air conditioner operation apparatus is not necessarily configured such that the displayed target temperature line itself is moved. The air conditioning apparatus may be configured such that the target temperature line is indirectly moved by dragging a control mark which is connected to a period border line.

An identification display visually indicating to the user, for example, that the period border lines and target temperatures lines subjected to dragging are movable, may be provided. If the period border lines and target temperature lines are merely displayed, it is considered that there is a possibility of user not knowing that they are movable. In this regard, by performing an identification display to explicitly indicate that the period border lines and target temperature lines are movable, it can be made known to the user that a period or target temperature can be changed, in other words, it is possible for the user to change the period or the target temperature by moving the period border lines or target temperature lines. In visually informing the user that operation is possible, a misoperation may be decreased and operation can be performed instinctively.

In another example, a virtual line may be displayed to compare the position before and after dragging for at least either one of the period border lines and the target temperature lines. The settings before the change can be therefore known, and, for example, if an erroneous control occurs during the operation, the settings can be immediately reversed.

It is further preferred that for each period, the target temperature that is set for the period is surrounded by the period border line and the target temperature line, and the region may be shaded in a different color than the background of the setting screen of the display unit. In showing the set target temperature for the period in region, the displaying space can be reduced in size and miniaturization of the operation apparatus achieved.

On the other hand, if the period is short then the region will also be small, and it is thus possible that the target temperature is either difficult to see or not seen at all. Hence, by shading inside the region area therein, the settings for a smaller region can be known to an extent as a relative value of the adjacent region. In this case, it is considered that if a region is small then the adjacent region will be relatively large, and also considering that the target temperature is shown numerically in the relatively large area, the approximate target temperature can be made known to the user.

In another example, the period border line subjected to the move and thus dragged therein, will move to the adjacent position, whilst maintaining the pre-determined minimum period intervals of the other period border lines. In this case, if the dragging is continued the other adjacent period border lines can also be simultaneously shifted with the period border line that is subjected to the move therein. As a result, if there is a desire to change a particular period, for example, the other period border lines will not limit the dragging movement. Also, if there is a desire to change a particular period border line, it is not necessary to repeat a control such as changing the adjacent border lines beforehand, and the usability can be improved.

In another example of an air conditioning operation apparatus, the target temperature can be set for both the cooling operations and heating operations in each of the periods. In this example, the target temperature is the threshold value to start the cooling operation, as well as a cooling target temperature which is the target temperature for the cooling operation in each period. Additionally, a heating target temperature is the threshold value to start the heating operation, and the target temperature for the heating operation is set for each period. There is a common period border line for both the cooling operation and heating operation, in this example, if a period border line is dragged to change therein, both the cooling target temperature and the heating target temperature may be reset for the period. Depending on the region, there can be a large change in the temperature in one day and in this case, for example, a method of heating operation in the morning and a cooling operation in the afternoon can be considered. If however the rising time of the user is approximately the same every day, for example, for this period, both the cooling operation and the heating operation can be considered as the same. In which case by configuring a common period border line for both the cooling and heating operation, either one can be set by a single setting, therefor the usability is can be improved.

In a further example, a cooling region shown as a region between a period border line and a cooling target temperature line, which is the target temperature line indicating the cooling target temperature, and the heating region shown as a region surrounded by a period border line and a heating target temperature line, which is the target temperature line indicating the heating target temperature, are shown facing each other on the display unit. Among the cooling target temperature lines and the heating target temperature lines described above, the target temperature line subjected to dragging, moves to the adjacent position keeping the pre-determined minimum temperature range of the other target temperature lines, and if dragging is continued thereafter, both the target temperature line subjected to the move, and other target temperature lines may be shifted. If there is a desire to lower the temperature of the cooling operation, for example, the lower limit temperature is not restricted by the upper limit of the heating operation, therefore it is unnecessary to lower the upper limit of the heating operation beforehand, and as a result repeated controlling also is not needed.

In a further example, the cooling region shown as a region surrounded by period border lines and the cooling target temperature line which is a target temperature line indicating the cooling target temperature, and the heating region shown as a region surrounded by the period border lines and the heating target temperature lines which is a target temperature indicating the heating target temperature, are shown facing each other on the display unit. Among the cooling target temperature lines and the heating target temperature lines described above, the target temperature line subjected to the dragging moves to the adjacent position keeping the pre-determined minimum temperature range of the other target temperature lines, and if the dragging is continued thereafter, both the temperature target line subjected to the move and other target temperature lines may be shifted. Thus, if there is a desire to increase the upper limit of the heating operation, for example, the lower limit of the cooling operation is no longer changed, and possible erroneous cooling operations can be avoided.

DETAILED DESCRIPTION OF THE PREFERRED EMBODIMENTS

With reference drawings, the embodiments in the present disclosure are described below with reference to the drawings. Items which are substantially common are labeled with the same symbol, and the details therein are omitted. In the following embodiments, the temperature is expressed as Fahrenheit.

First Embodiment

Figure 1:
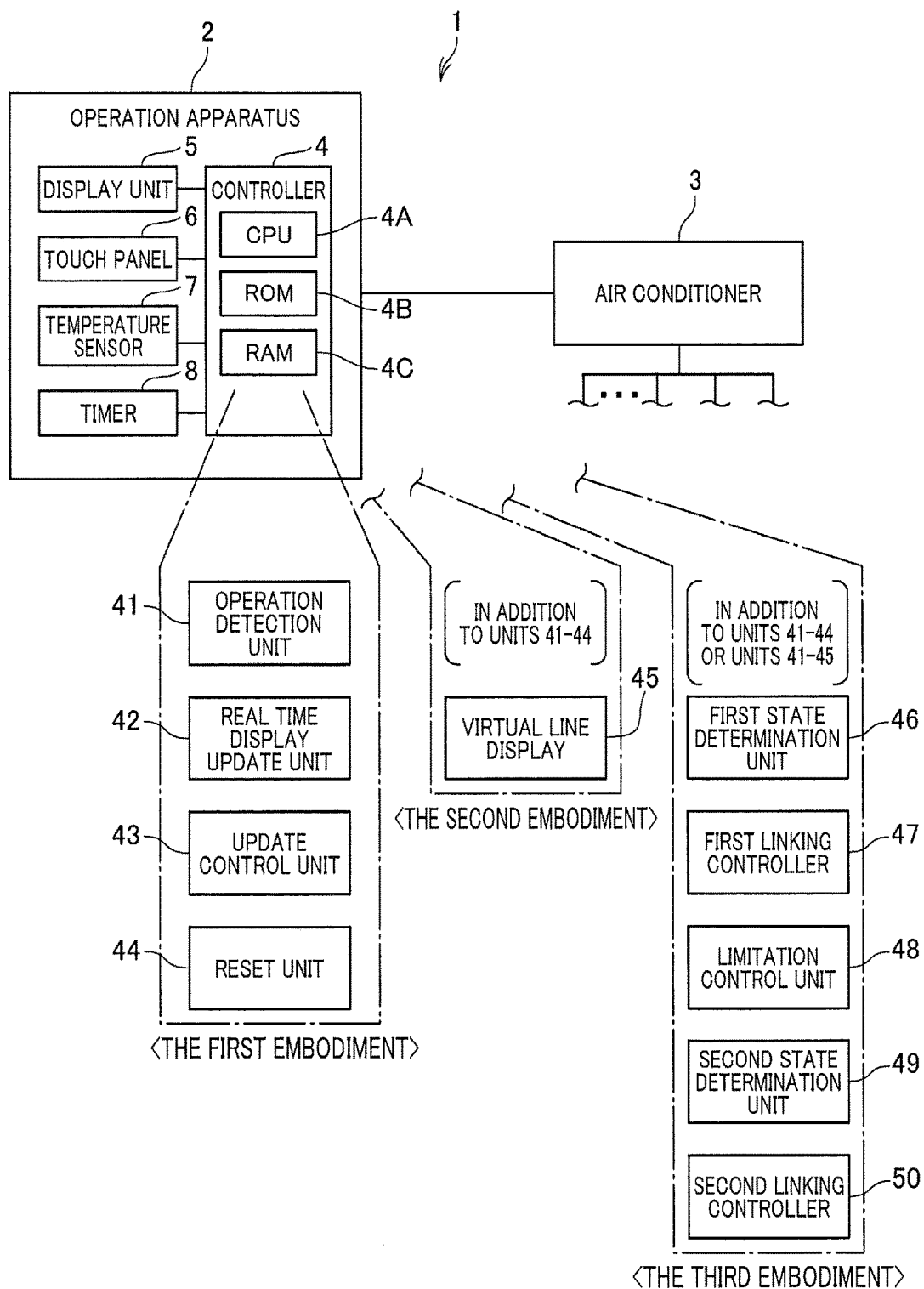
FIG. 1 is a diagram showing an outline configuration an air conditioning system according to the first, second and third embodiments.

A description of a first embodiment in the present disclosure is given below with reference to FIG. 1 to FIG. 5. FIG. 1 will also serve as a description for the second and third embodiments described later. As shown in FIG. 1, a central heating system 1 for the first embodiment is provided with an operation apparatus 2, and an air conditioning apparatus 3 connected to the operation apparatus 2. The air conditioning apparatus 3 is configured by for example a heat pump-type cooling system, and a gas-type heating system. The air conditioning apparatus 3 not shown in diagram 1, supplies cool or warm air produced therein to each room. The configuration of the central heating system shown in FIG. 1 is one example.

The operation apparatus 2 is provided with a controller 4, a display unit 5, a touch panel 6, a temperature sensor 7 and a timer 8. The controller 4 is provided with a microcomputer that has a CPU (central processing unit) 4A, a ROM (read only memory) 4B functioning as a non-transitory computer readable medium, and a RAM (random access memory) 4C. The CPU 4A controls the whole of the operation apparatus 2 by loading each program stored in the ROM 4B to their own work area. More specifically, the controller 4 (CPU 4A) as described later, controls each unit by, for example, displaying (information) to the display unit 5, receiving input from touch panel 6, and operating the start/stop operations for the air conditioning apparatus 3 corresponding to time acquired from the timer 8 which is based on the room temperature detected by the room temperature sensor 7.

Figure 2:
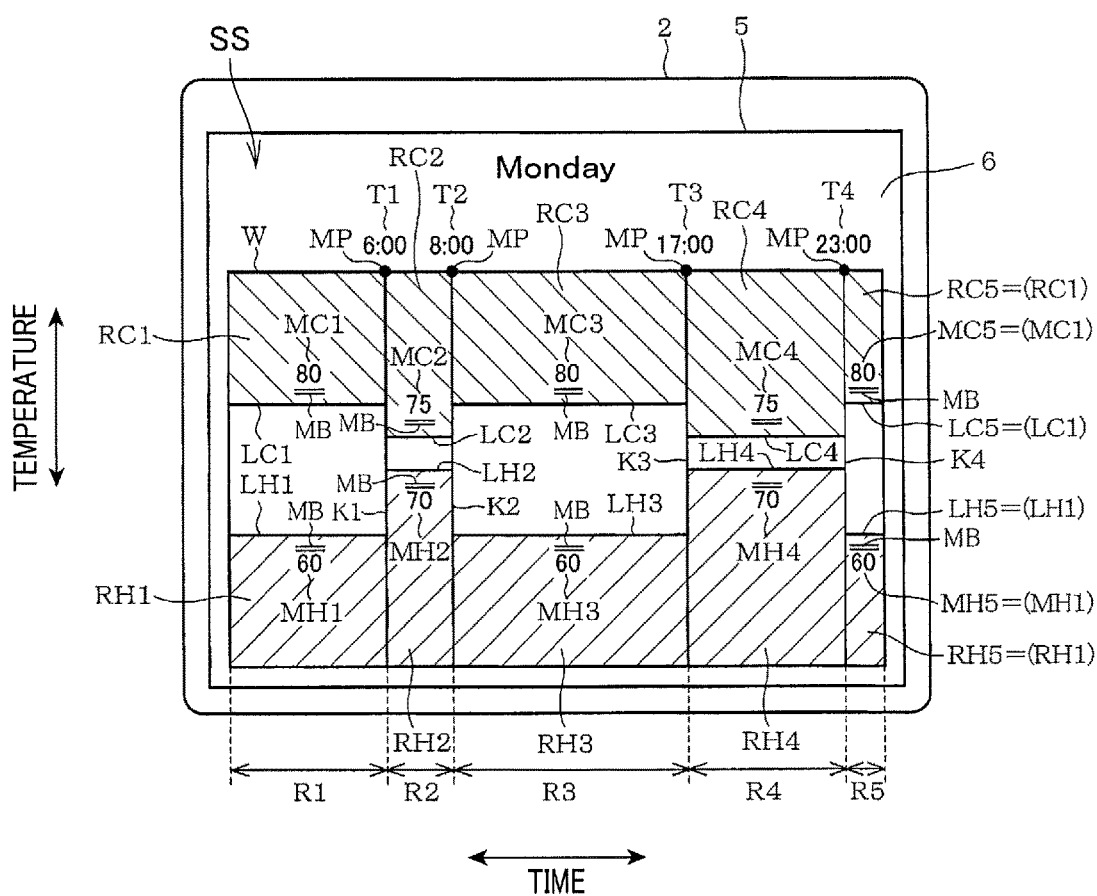
FIG. 2 is a schematic diagram showing an example of a setting screen of the operation apparatus according to the first embodiment.

In the present embodiment, the display unit 5 is an approximately 5 inch liquid crystal display 5, including a color display function. The display unit 5 is not limited to a liquid crystal display, and other configurations may also be used, such as an organic EL display unit. As shown in FIG. 2, the display unit 5 is provided with a touch panel 6 corresponding to the screen. A known structure such as a pressure-sensitive or electrostatic-type may be employed as the touch panel 6. The temperature sensor 7 may detect the temperature of a room where the operation apparatus 2 is installed. The temperature sensor 7 may also be installed as a separate apparatus from the operation apparatus 2, or configured such that a plurality of temperature sensors are used to detect different room temperatures. The operation apparatus 2 is attached, for example to the wall and is used by the user.

In the operation apparatus 2, each item of data in the central heating system 1 can be set as either default data or as interactive data. The settings include a temperature setting to indicate the start/stop of the operation of the air conditioning apparatus 3, and information showing the period (time period) in a day and the type of operation to be operated. These settings are performed by the operation of the user operating the touch panel 6. In this embodiment, the dragging hereafter refers to an optional point on the screen in which the user touches the screen with a finger, for example, and in this position slides the finger.

FIG. 1 is a block diagram functionally showing the operating procedure for the air conditioner apparatus 3, executed by the controller 4, according to the first embodiment. The CPU 4A (controller 4) performs a program for the operating process above which is a program previously stored in the ROM 4B, and the controller 4 is functionally configured by at least; an operation detection unit 41, a real-time display update unit 42, update control unit 43, and reset unit 44. The function of each of the units 41 to 44 will be described later.

It should be noted that, in FIG. 1, for the second and third embodiments which is described later, in addition to the units 41 to 44, the controller 4 functionally provides other units which are also shown. In the second embodiment, a virtual line display unit 45 has been added in addition to units 41 to 44. In the third embodiment, as one example a first state determination unit 46, a first linking controller 47, a limitation control unit 48, a second state determination unit 49 and a second linking controller 50 are shown together, in addition to units 41 to 44. The units 45-50 are respectively described in the embodiments.

As a matter of course the first embodiment can practiced individually, or features of the first embodiment may be combined with those of the second and/or third embodiments as long as no inherent technical contradiction arises.

The operation apparatus 2 is a setting screen SS displayed on the display unit 5, as shown in diagram 2. In this setting screen SS, there is a graphic user interface (GUI) with a display frame W, where the horizontal direction shows the time for one day (for example 24 h) and the vertical direction shows the temperature. More specifically, for the first embodiment, in the display frame W the left end of the diagram shows time 0 h, the right end of the diagram shows the time 24 h, the upper end of the diagram shows 100 degrees Fahrenheit and the lower end of the diagram shows 40 degrees Fahrenheit. Among the above, the 100 degrees Fahrenheit at the upper end of the diagram indicates the maximum temperature of the central heating system 1, and the 40 degrees Fahrenheit shown at the lower end of the diagram indicates the minimum temperature of the central heating system 1. From hereon, for convenience the horizontal direction of the frame W is referred to as the time axis direction, and vertical direction of the frame W is referred to as the temperature axis direction.

It should be noted that the time for one day shown in the horizontal direction of the display screen does not necessarily have to be a span of 24 hours. The time for one day here refers to the operation of the air conditioning apparatus 3, depending on the user's life style, for example, (it is necessary that the time is shown on the display unit) this is defined as the desired length of activity time within a span of 24 hours. Thus, one day may be for example 12 hours or 16 hours. In which case the length of the time displayed on the display unit 5 in the horizontal direction is 12 hours or 16 hours. In the following examples, the time for one day is shown as a 24 hour span.

In the inside of the display frame W, one day is divided into several periods along the time axis direction, and the dividing line segments are border lines between periods that are adjacent to each other, in a predetermined direction on the screen. According to the first embodiment, the period border lines K1 to K4 that are movable in the time direction only at 15 minute intervals are provided. Among the periods divided by the period border lines K1 to K4, the period from the left end of the display frame W to the period border line K1 is, namely, a sleeping period R1, from the period border line K1 to the period border line K2 a rising period R2, from the period border line K2 to the period border line K3 an absent period R3, from the period border line K3 to the period border line K4 a present period R4, and from the period border line K4 to the right end of the display frame W period a sleeping period R5, set respectively.

The sleeping period is however from the period border line K4 of the previous day to the period border line K1 of the next day which is the present, that is, the sleeping period R5, and sleeping period R1, respectively are considered a single period, and therefore one day is divided essentially into 4 parts. The operation apparatus 2 can be changed to the setting screen for the next day by using the flicking control on the screen.

In the period border line K1 to K4, there is a control mark MP at the upper end of the dividing line segments, to move each of the respective period border lines K1 to K4 individually, and T1 to T4 are shown to indicate a time zone for each of the period border lines K1 to K4. The control mark MP is the control mark to drag the period border lines K1 to K4, where the user touches the control mark MP with a finger and moves the corresponding/designated period border on the screen by dragging, as described later in FIG. 3, for example. In other words, in the first embodiment, the period border line can be moved indirectly by dragging the control mark MP. The control mark MP is the equivalent of an identification display visually showing the user that the control MP mark is movable.

For each of the periods R1 to R5, the threshold value to start each cooling operation and the cooling target temperatures MC1 to MC5 which are the target temperatures for this cooling operation, and the target temperature to start the heating operation, and the heating target temperatures MH1 to MH5 which are the target temperatures for the heating operation are shown. As described above, the cooling target temperature MC5 is essentially the cooling target temperature MC1, and the heating target temperature MH5 is essentially the heating target temperature MH1.

The operation apparatus 2, commands the cooling operation to start when the room temperature increases above 75 degrees Fahrenheit, for example, at the rising time R2, in response to the air conditioning apparatus 3, and the air conditioner operates cooling operation until the room reaches 75 degrees Fahrenheit. At this time, when the room temperature at 75 degrees Fahrenheit decreases by more than 0.5 degrees Fahrenheit, the cooling operation stops since the room is sufficiently cooled. If however, the room temperature decreases below 70 degrees Fahrenheit, the operation apparatus 2 commands the air conditioning apparatus 3 to start the heating operation in order to optimize the room temperature to 70 degrees Fahrenheit, for the rising period R2. At this time, when the room temperature increases by more than 0.5 degrees Fahrenheit above 70 degrees Fahrenheit, the heating operation stops since the room is sufficiently heated. Therefore, there is a 1 degree interval range between the cooling target temperature and the heating target temperature which is not in the operating range for the air conditioning system.

The cooling target temperatures MC1 to MC5 and the heating target temperatures MH1 to MH5 are numeric values and the dividing line segments showing the target temperature set for each period. The cooling target temperatures MC1 to MC5 and the heating target temperatures MH1 to MH5 are positioned in an orthogonal direction from the period border lines K1 to K4, in the temperature direction for the first embodiment, and can also be shown as the heating target temperature lines LH1 to LH5 and the cooling target temperature lines LC1 to LC5, which are equivalent to the target temperature that is movable independent to the period border lines K1 to K4. The regions RC1 to RC5 and RH1 to RH5, surrounded by the period border lines K1 to K4 and cooling target temperatures lines LC1 to LC5 or the heating target temperature lines LH1 to LH5, are the range where either the cooling operation or the warming operation is performed.

In the first embodiment, the regions that perform the cooling operation RC1 to RC5 are arranged at the upper part of the temperature axis direction, and the regions for performing the heating operation RH1 to RH5 are arranged at the lower part of the temperature axis direction, positioned facing each other therein. This is because, usually, when the room temperature is high the cooling operation is operated and when the room temperature is low the heating operation is performed.

In arranging the regions in a facing position, the user can know intuitively that for the regions operating the cooling operation RC1 to RC5 shown at the upper part of the display frame is the maximum setting conditions, and that the greater the distance is from the upper end of the display frame W the greater the electricity consumption is, as shown in a bar graph that stretches from the top of the screen downwards in the display frame W. The user can also know intuitively that for the regions operating the heating operation RH1 to RH5, the lower part of the display frame W is the minimum setting conditions, and the greater the distance from the bottom end of the display frame, the greater the electricity consumption, as shown in a bar-graph that stretches from the bottom of the screen upwards in the display frame W.

According to the first embodiment, the color of the background display is black, in contrast, as shown in FIG. 2 with the hatching patterns, the regions RC1 to RC5 operating the cooling operation are shown shaded in a cool blue-type color, and the regions performing the heating operation RH1 to RH5 are shown shaded in a warm orange-type color. The user can therefore, intuitively know whether the cooling operation or the heating operation is set by looking at the screen.

There are control bars MB positioned near to each of the respective cooling target temperatures MC1 to MC5 and the respective heating target temperatures MH1 to MH5. The control bars MB, as like the control marks MP described above, are equivalent to an identification display visually showing the user that the cooling target temperature lines LC1 to LC5 and the heating target temperature lines LH1 to LH5 are movable, and also showing the position touched by the user. The control bars MB are positioned at the lower end of the numeric values for the cooling target temperatures MC1 to MC5, and also positioned at the upper end for the heating target temperatures MH1 to MH5. In dragging the control bars MB, the moved target temperature of a period within the cooling target temperatures MC1 to MC5 or the heating target temperatures MH1 to MH5 can be changed.

Figure 3:
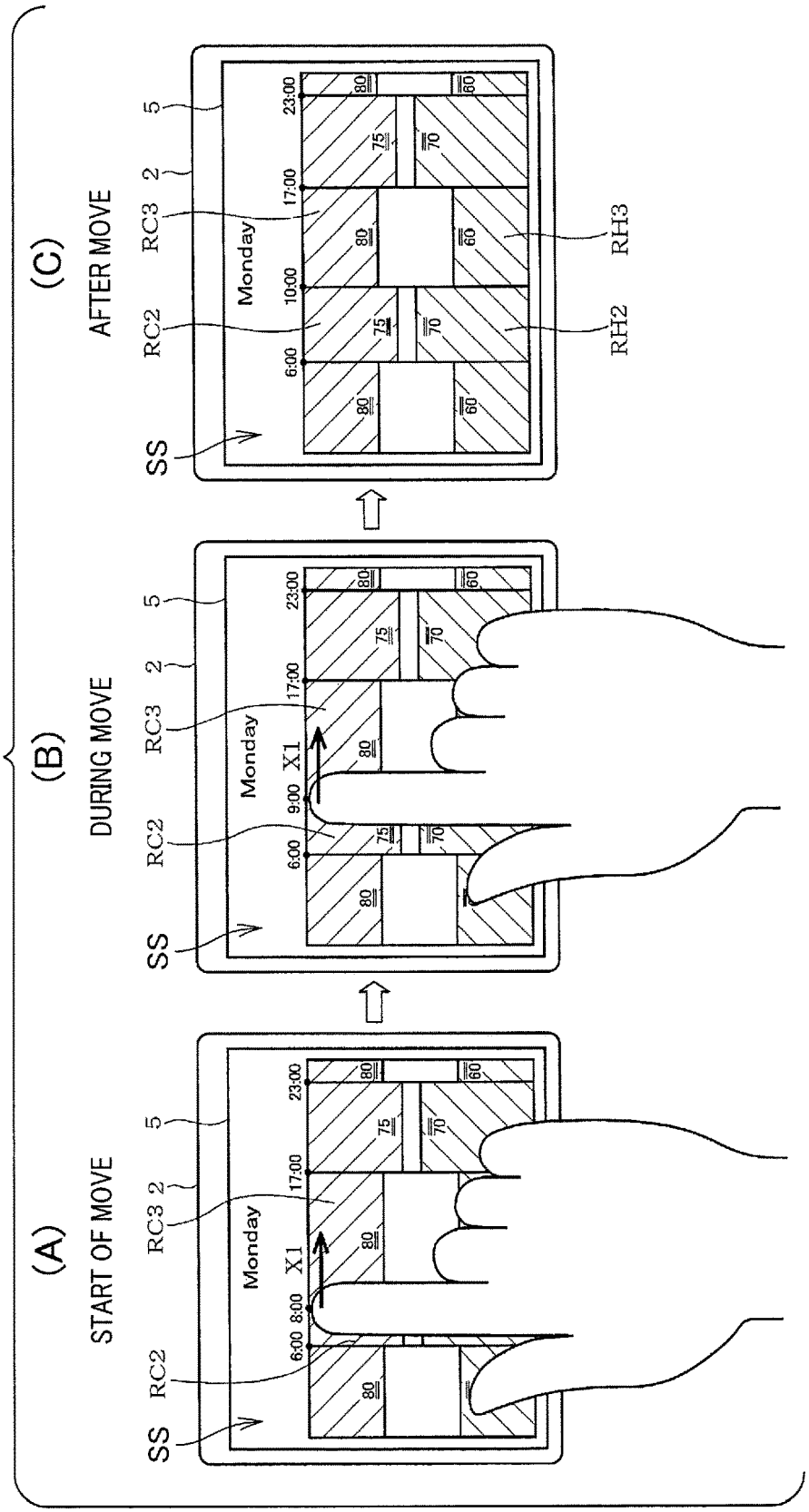
FIG. 3 is a schematic diagram showing an operation mode when changing the period according the first embodiment.
Figure 4:
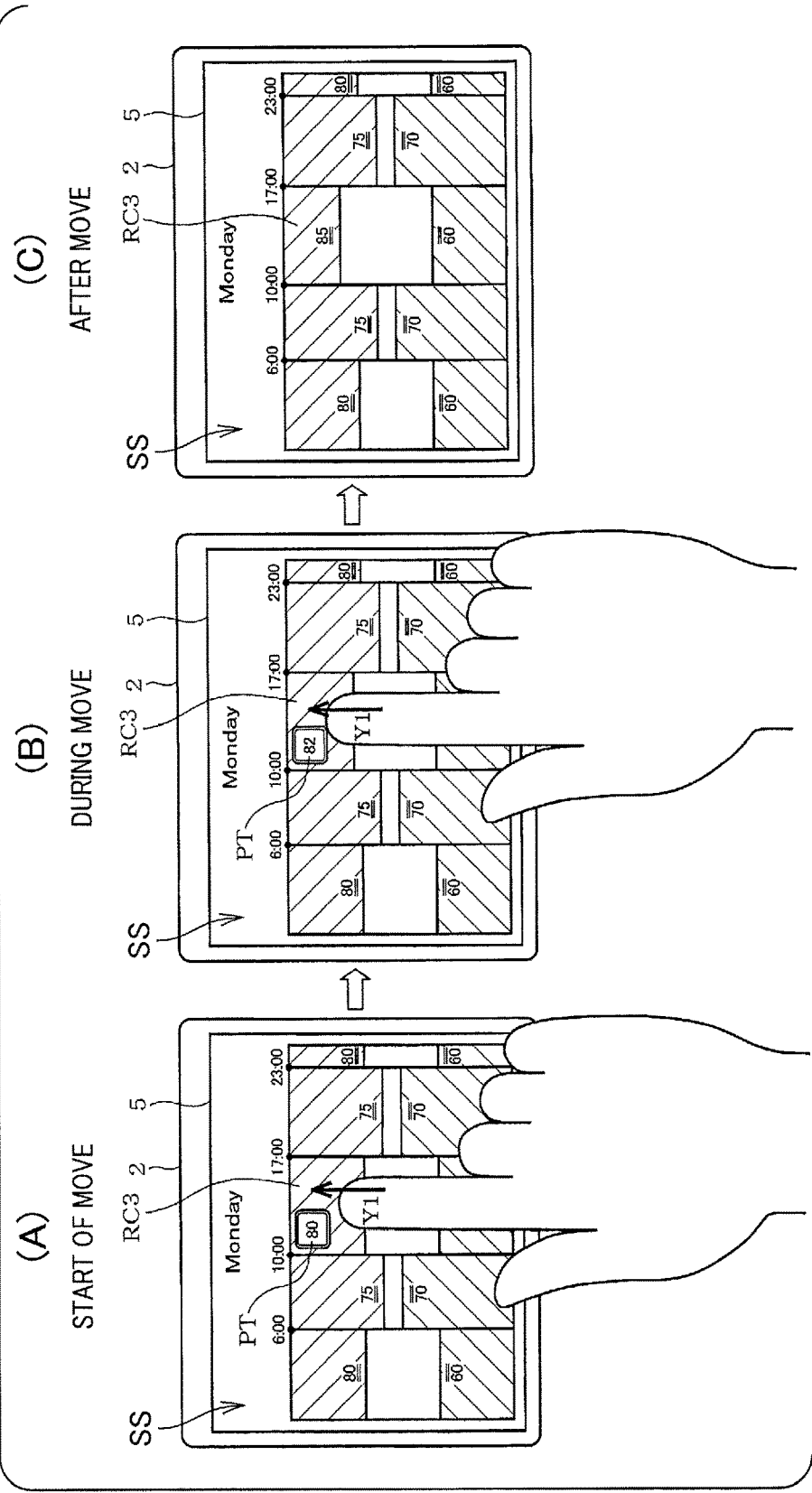
FIG. 4 is a schematic diagram showing an operation mode when changing the target temperature according the first embodiment.
Figure 5:
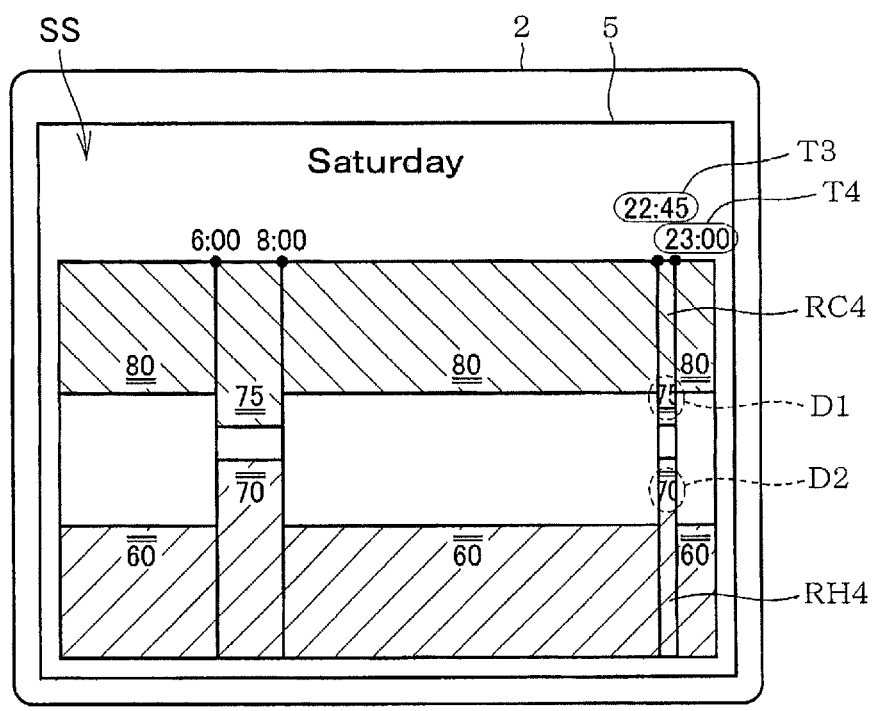
FIG. 5 is a schematic diagram of a display when the letters are cut off according to the first embodiment.

The specific operation mode for the configuration above is now described referring to FIG. 3 to FIG. 5.

FIG. 3 schematically shows the operation mode when changing the rising period R2 by moving the period border line K2, which is the border of periods R2 and R3. Before the change is performed, that is the point before moving the period border line K2, the start time of the rising period R2 is set at 6:00, the stop time set at 8:00, the cooling target temperature MC2 of the RC2 region is set at 75 degrees Fahrenheit and the cooling target temperature MC3 of the region RC3 at 80 degrees Fahrenheit, the heating target temperature MH2 of the region RH2 is set at 70 degrees Fahrenheit, and the heating target temperature MH3 of the region RH3 at 60 degrees Fahrenheit.

In this state, if there is a desire to change the stop time of the period R2 to 10:00, the user touches the period border line K2 with a finger and moves the control mark MP by dragging in the direction indicated by X1, (refer to FIG. 3 (A). The dragging is then detected by the operation detection unit 41 of the controller 4.

Whilst moving the control mark MP, the time T2 is changed real time, with the movement of the user's finger in the direction of the time axis (refer to FIG. 3 (B). The change is performed by the real-time display update unit 42 of the controller 4. After the period border line K2 is moved to 10:00, the T2 time is thus changed to 10:00 when the movement is completed, as the user releases the finger. The change is made by the update control unit 43 of the controller 4. As a result, the stop time of region 2 together with the start time of the region 3 are changed (refer to FIG. 3 (C)).

As region R2 and region R3 are changed, the cooling target temperature MC2 and the heating target temperature MH2 set for region R2 before the change are thus reset for the region 2 after the change, and the cooling target temperature MC3 and the heating target temperature MH3 set for the region R3 before the change, are thus reset for the region R3 after the change (refer to FIG. 3 (C). The resetting is performed by the reset unit 44 of the controller 4.

Specifically, the time period 8:00 to 10:00 was designated to be the R3 region before the change. The target temperatures were set at 80 degrees Fahrenheit for the cooling target temperature MC3, and at 60 degrees Fahrenheit for the heating target temperature MH3, however the period R2 was then extended to 10:00. The time period 8:00 to 10:00 is therefore then designated to region R2 after the change, and the respective target temperatures are automatically set to 75 degrees Fahrenheit for the cooling target temperature MC3 and to 70 degrees Fahrenheit for the heating target temperature MH3.

In short, by dragging the period border line K2 only, the adjacent periods R2 and R3 are simultaneously changed and the target temperatures for regions R2 and R3 are automatically transferred over and reset after the change. Thus, compared with the conventional way of pressing a control button several times, the number of controls can be markedly reduced.

This kind of controllability is the same for the target temperature. The operation mode when changing the cooling target temperature MC3 of the region RC3 is schematically shown in FIG. 4. Before the change, that is the point before moving the cooling target temperature line LC3, the cooling target temperature MC3 is set at 80 degrees Fahrenheit as shown in FIG. 2.

At this time, if there is a desire to change the cooling target temperature to 85 degrees Fahrenheit, the user touches the control bar MB that corresponds to the cooling target temperature MC3, and the cooling target temperature line LC3 is moved along the temperature axis to the upper part by dragging as shown with the arrow Y1 (refer to FIG. 4 (A)). The drag control is detected by the operation detection unit 41 of the controller 4. In the case of a small screen, however, there is a possibility of the cooling target temperature MC3 being partially hidden by the user's finger. Thus, in the first embodiment when the finger touches the control bar MB bar the cooling target temperature MC3 is shown in a pop-up display PT (refer to FIG. 4 (B). This display is the pop-up display function of the real-time display update unit 42 of the controller 4. The pop-up display PT is changed in real time by moving the control bar MB. Thus the user is able to know what the present temperature is whilst moving the control bar MB.

The target temperature for the region R3 is set, for example, at 85 degrees Fahrenheit at the point of releasing the finger from the control bar MB after dragging the control bar MB to the desired temperature, which is performed whilst checking the pop-up display PT (Refer to FIG. 4 (C). The setting is performed by the update control unit 43 of the controller 4.

Thus, compared with the conventional way of pressing a control button several times, the number of controls can be markedly reduced. As described above, the cooling target temperature line LC3 moves independently from the period border lines K1 to K4, therefore when moving the cooling target temperature line LC3 the possibility of erroneously moving the period border line can be reduced.

Incidentally, the period border lines K1 to K4 can be moved at 15 minutes intervals as mentioned above, however if the distance between the adjacent period border lines is short, as shown in FIG. 5 like with the regions D1 and D2, there is a possibility of the target temperature being visually unclear or not being seen at all. According to the first embodiment, even if the target temperatures, for example, of the respective regions RC4 and RH4 are visually unclear, by showing the regions RC1 to RC5 and RH1 to RH5 shaded, the user can know whether or not the temperature is relatively high or low from the adjacent regions RC3, RH3, RC5 and RH5.

Furthermore, when the period border lines K3 and K4 become close, there is a possibility of the time T3 and time T4 overlapping, and thus difficult to clearly see the time. Thus, according to the first embodiment, if the times T1 to T4 overlap as shown in FIG. 5, in showing the time in a different position, for example, other than the vertical direction, can prevent the possibility of the time appearing unclear.

In this way, the operation apparatus 2 can enable the change of the set target temperature for each of the periods by dragging the target temperature lines LC1 to LC5 and LH1 to LH5 to move therein, and also enable the change of the periods R1 to R5, by dragging the period border lines K1 to K5 to move therein.

The following effect can be obtained from the first embodiment described above. A day can be divided into several periods R1 to R5 based on the desired length decided by the user. By dragging the period border lines K1 to K4 that are the borders between the adjacent periods to move therein, the start/stop for the operation of the air conditioning of the adjacent periods are simultaneously changed, and thus since the period can be set by a single drag and it is not necessary to use the control button several times, the period can be changed easily.

Since the configuration is such in that the period border lines K1 to K4 move in a fixed direction, even if the user's finger control is slightly unsteady when performing the drag control, the period border lines K1 to K4 can be moved accurately. Hence, if the user is a child or an elderly person the operation can be achieved simply and the possibility of an erroneous input decreased with improved usability.

Additionally, if the stop time, for example, of a specific period is changed, the start time of other periods that are adjacent in a timely manner are also simultaneously changed, therefore a plurality of periods are simultaneously changed by a single control and the target temperature set for the period before the change is reset for the period after the change. Thus, since when a period is changed the corresponding target temperature will automatically change and the usability can be improved.

The target temperature lines LC1 to LC5 and LH1 to LH5 are shown, and either one of the target temperature lines is dragged so that the line moves. Thus, the target for a period is changed by moving the corresponding target temperature line. As the target temperature can be changed to the desired temperature by a single drag, even if the setting is possible, for example, at a 1 degree interval it is not necessary to use the control button several times and the target temperature can be easily changed.

In this case, since the target temperature lines LC1 to LC5 and LH1 to LH5 are configured to move in an orthogonal direction from the period border lines K1 to K4, when the target temperature lines LC1 to LC5 and LH1 to LH5 are moved, an erroneous movement of the period border lines K1 to K4 can be prevented. In contrast, when the period border lines K1 to K4 are moved, an erroneous movement of the target temperature lines LC1 to LC5 and LH1 to LH5 can also be prevented and therefore controllability and the usability is improved.

As described in this embodiment, in positioning the mark MP, used to move the period border lines K1 to K4, on top of the upper frame part display frame W, that is, in positioning the mark MP among the range of the target temperature lines LC1 to LC5 and LH1 to LH5, the possibility of an erroneous control the can be further reduced.

An identification display visually shows the user that the period border lines K1 to K4 and the target temperatures lines LC1 to LC5 and LH1 to LH5 that are subjectable to dragging, are movable by the control mark MP and the control bar MB. As a result, the user can know that that the periods and the target temperatures are changeable by moving the period border lines K1 to K4 and the target temperature lines LC1-LC5 and LH1 to LH5, that is, the periods and the target temperatures are changeable as the respective period border lines and target temperatures are moved.

For each of the respective periods R1 to R5, the target temperatures MC1 to MC5 and MH1 to MH5 that are set for the periods in the regions RC1 to RC5 and RH1 to RH5, are shown surrounded by the target temperature lines LC1 to LC5 and LH1 to LH5, and the period border lines K1 to K4. The regions RC1 to RC5 and RH1 to RH5 are shown shaded in a different color from the back ground in the setting screen SS of the display unit 5. In this way, by showing the target temperature that is set for the period within the region, the display space can be made smaller and miniaturize of the size of the operation apparatus 2 can be provided.

In the first embodiment, in order identify either one of the setting conditions easily, the regions operating the cooling operation RC1 to RC5 are shown shaded with a cool color-type (to represent the cooling region), and the region performing the heating operation RH1 to RH5 shown with a warm color-type (to represent the heating region).

On the other hand, in the case of a short period, since the region becomes smaller there is a possibility of the target temperature being difficult to visualize, or not being seen at all. Thus, by shading the region the user can know the value of the target temperature as a relative value of the adjacent region to an extent of even a smaller region. In this case, if a region is relatively small then the adjacent region is considered to be relatively big, thus considering the target temperature in the relatively big region is shown numerically, the approximate target temperature can be made known to the user.

In addition, the shaded region is conditional to the operation state, therefore the electricity is consumed. The electricity consumption increases with the size of the shaded region, that is, the larger the area the more electricity is consumed. Therefore, the minimum consumption of electric power can be known intuitively, and also be used as an opportunity to raise the user's awareness on energy saving.

For each period, common period border lines K1 to K4 are provided for both the cooling and heating operations, therefore when dragging the period border lines K1 to K4 to change a period, both the cooling target temperatures MC1 to MC5 and the heating target temperatures MH1 to MH5 are reset after the change for the period. In a case where, for example the air conditioner is alternately performing a heat operation in the morning and a cooling operation in the afternoon due to a temperature difference during the day, since it is considered that a period is the same for both the cooling operation and the heating operation, the usability can be improved by making it possible to set both the cooling and the heating operation with a single setting.

Second Embodiment

Figure 6:
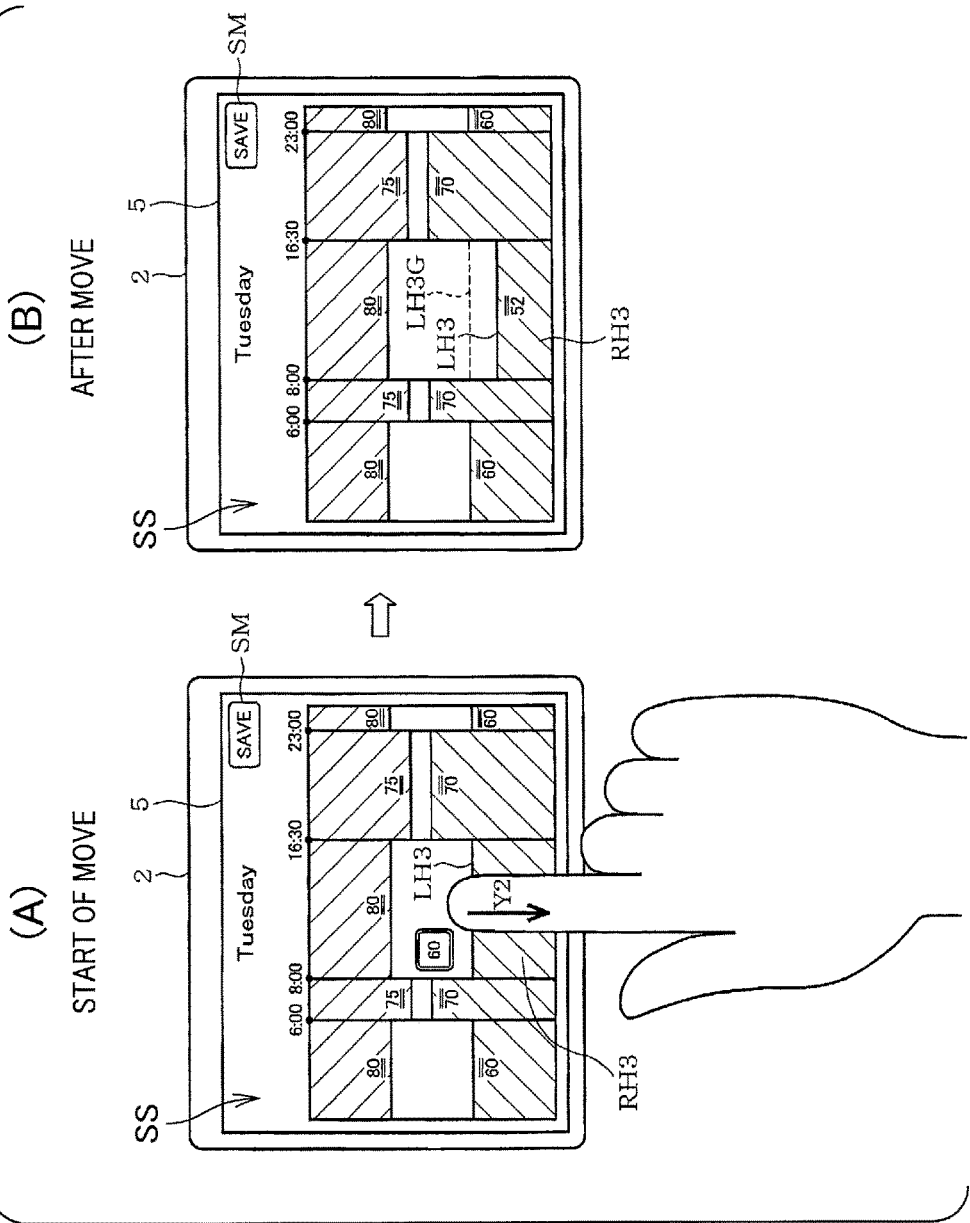
FIG. 6 is a schematic diagram of the operation mode when a target temperature is changed according to the second embodiment.
Figure 7:
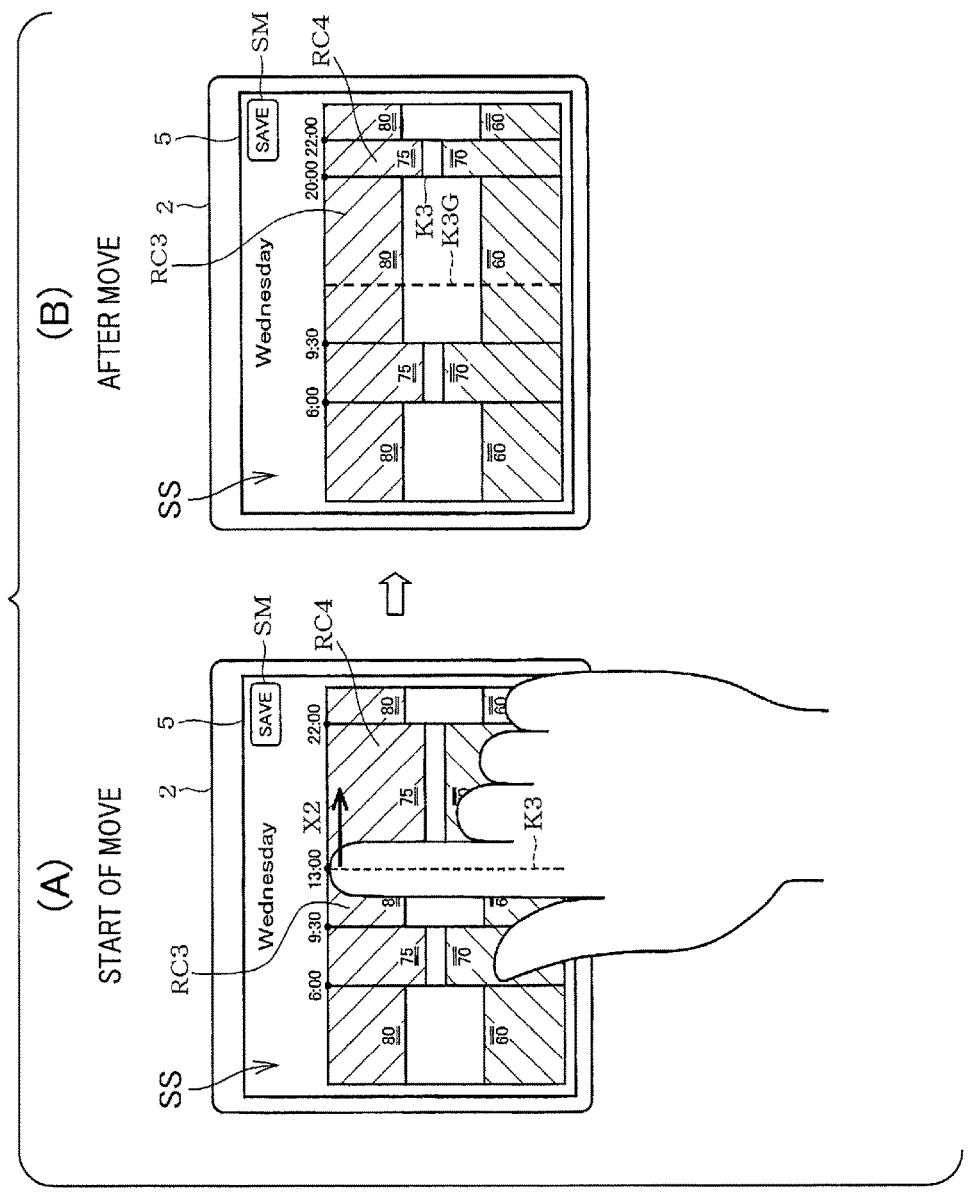
FIG. 7 is a schematic diagram of an operation mode when changing the target temperature according to the second embodiment.

A second embodiment of this disclosure is described referring to FIG. 6 and FIG. 7. In the second embodiment, the additional information that is shown when dragging is different than the first embodiment. The operation mode of the period border lines K1 to K4 and the target temperature lines LC1 to LC4 and LH1 to LH5, are the same as or similar to the operation mode described in the first embodiment, therefore the details of such the same or similar parts are omitted here.

For the second embodiment, the period border lines K1 to K4 and the target temperatures lines LC1 to LC5 and LH1 to LH5 before a change, are made known to the user until the changed is confirmed.

Specifically, as shown in FIG. 6, for example, if the heating target temperature for the region RH3 is changed from 60 degrees Fahrenheit to 53 degrees Fahrenheit with reference to the arrow Y2, the user moves the heat target temperature line LH3 along the temperature axis. In this case, the operation apparatus 2 indicates the initial starting position, for example, as a virtual line LH3G shown as broken line when the move is completed, that is, the point when the user's finger is released. This display operates as a function of the virtual line display 45 of the controller 4. Also, for example, by positioning the save mark SM the user can know that that the save mark SM has been operated. In other words, if the user shows a clear intention to make the change, then the change of target temperature can be accomplished. The confirmation is performed by the update control unit 43 of the controller 4.

As a result, even if an erroneous change is made, the initial setting can be retrieved instantaneously.

Likewise the position before change can also be shown for the period border lines K1 to K4. For example, in changing the period border line K3 from 13:00 position to the 20:00 position, that is, when the user moves the period border line K3 along the time axis in the right direction of the diagram as shown with the arrow X2, the operation apparatus 2 shows the position before the change as a virtual line 3G, for example, as a broken line until the save mark SM operation is performed. When the save mark SM is operated the change is then confirmed. The processes for these displays and confirmations are performed as a function of the virtual line display unit 45 of the controller 4 and the update control unit 43.

In this way, according to the second embodiment, if an erroneous control or move is performed, the initial settings can be retrieved. That is, for at least one of the period border lines K1 to K4 and the target temperature lines LC1 to LC5 and LH1 to LH5, a virtual line (LH3G and K3G) to compare the position before and after dragging to move the respective lines therein, can be shown in addition to the effects obtained from the first embodiment. In this case it is considered that the smaller the operation apparatus 2 is the higher the possibility of touching the adjacent period border line and target temperature line by mistake, therefore by knowing the settings before the change, an error can be instantly corrected.

Furthermore, it is considered that the smaller the operation apparatus 2 is the higher the possibility of erroneously touching the adjacent period border line and target temperature line, however, since a mistake can be instantly corrected, the possibility of user experiencing inconvenience is decreased and the miniaturization of the operation apparatus 2 can be planned.

In this case, according to the second embodiment described above the settings before change, that is, the position of the period border lines K1 to K4 before the previous change when the save mark is operated, is shown as a virtual line. However, the virtual line (virtual line display) may be shown during the operation of the change. In other words, at the point of changing the period border lines K1 to K4, the initial position is recorded temporarily, and when the user's finger is released if a further change is made thereafter, the position that is temporarily recorded can be shown as a virtual line. The display process of the virtual line is also operated as a function of the virtual line display unit 45 of the controller 4.

As a result, for example, if the position of the period border line is erroneously moved after a setting, and an adjacent period border line is touched mistakenly or unintentionally when controlling other period border lines, in these cases the initial settings can be retrieved and the usability improved.

Additionally, when the screen is small, the possibility of it being erroneously touched with a finger increases. However, an erroneous control can be corrected in showing a virtual line, therefore the miniaturizing the size of the operation apparatus 2 can also become a merit.

Third Embodiment

Figure 8:
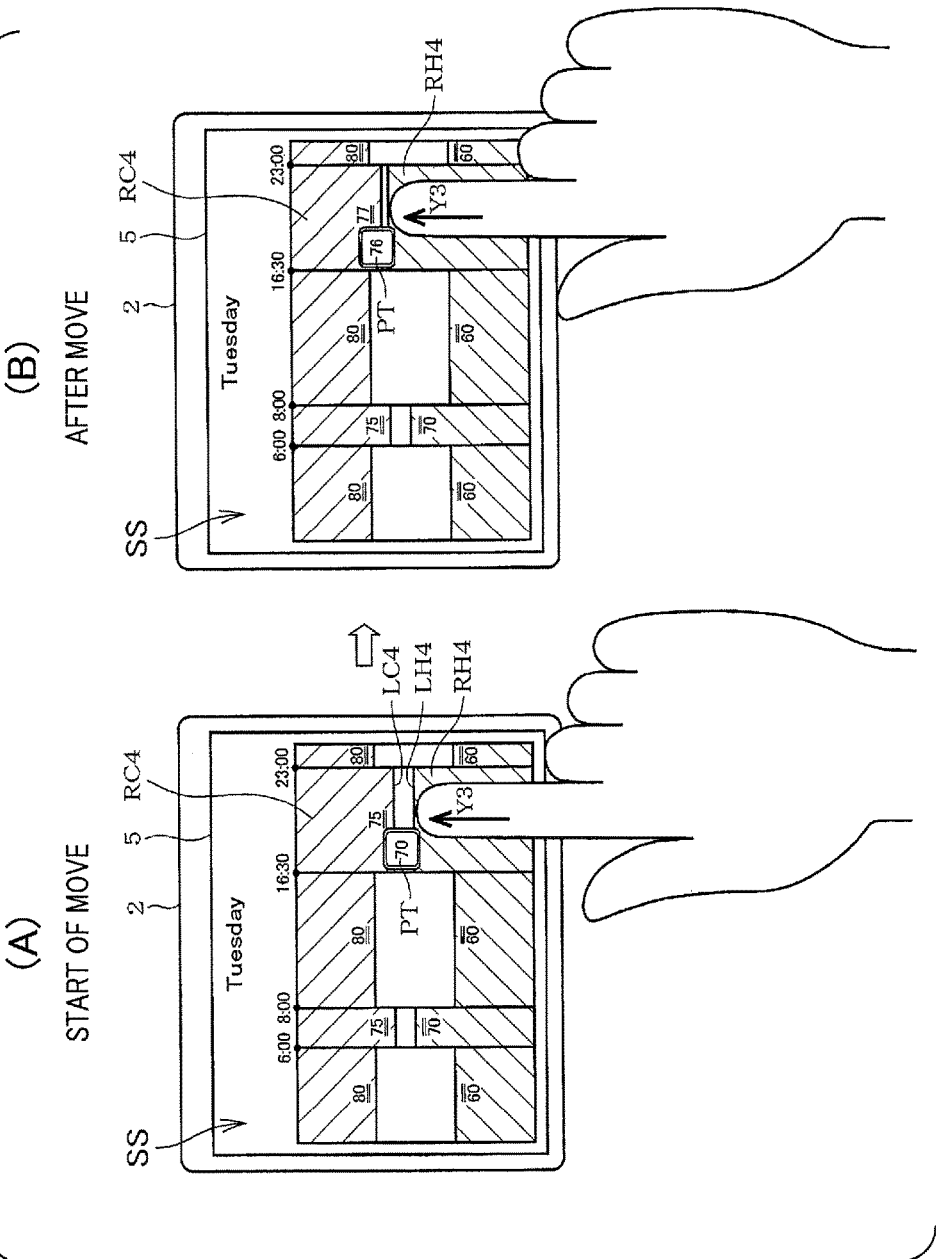
FIG. 8 is a schematic diagram of the operation mode when changing the target temperature according to the third embodiment (part 1)
Figure 9:
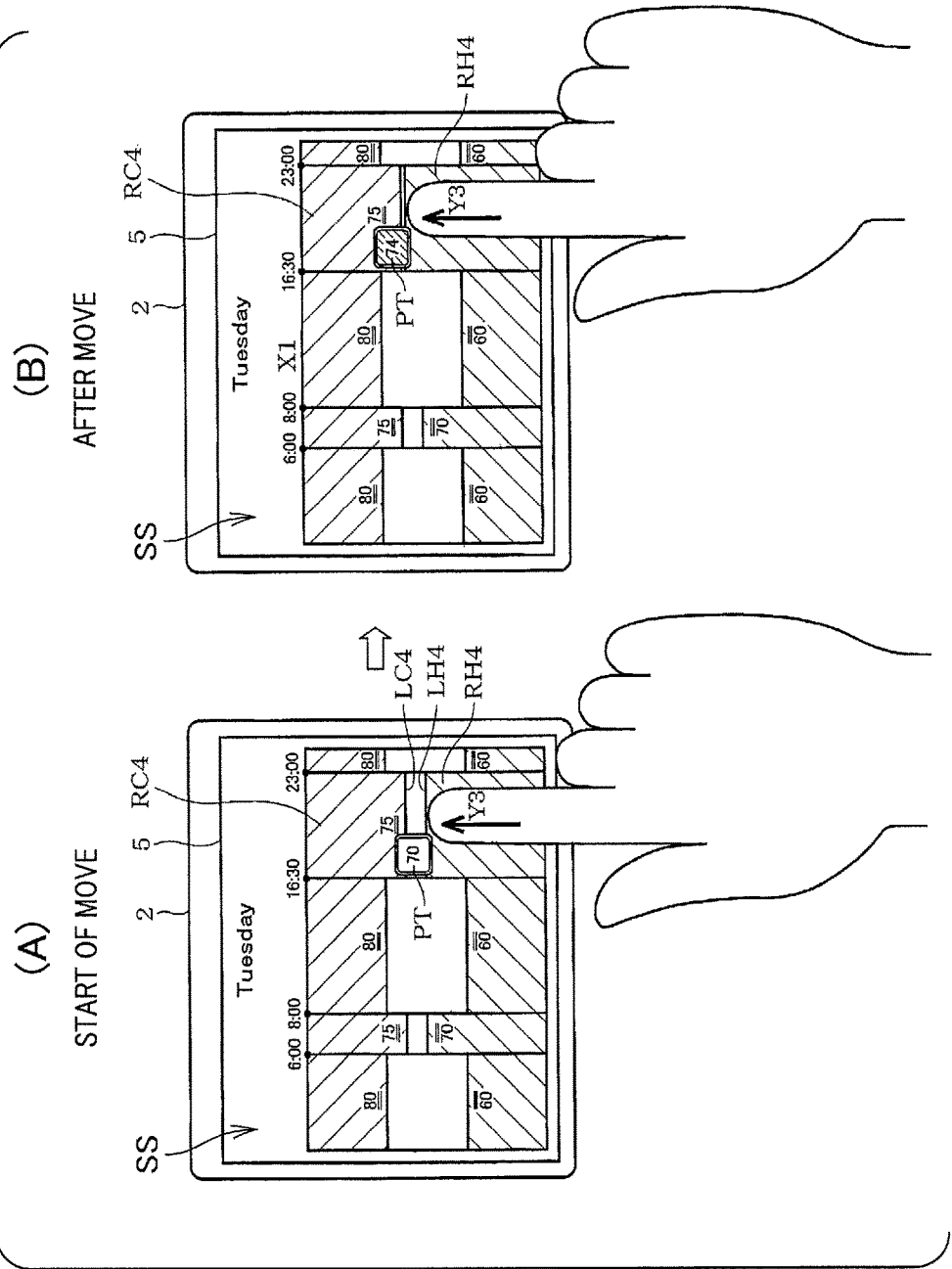
FIG. 9 is a schematic diagram of the operation mode when changing the target temperature according to the third embodiment (part 2)
Figure 10:
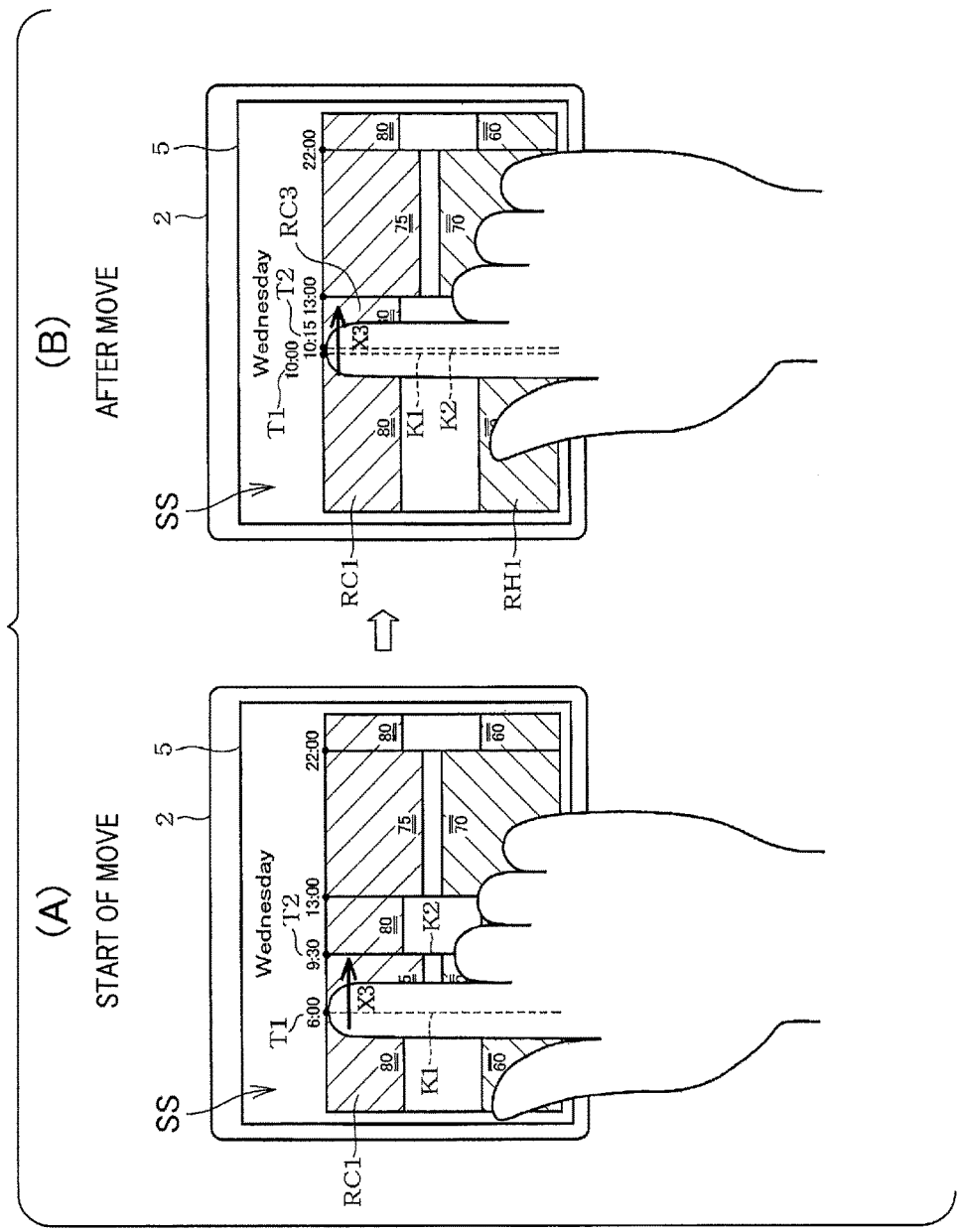
FIG. 10 is a schematic diagram of the operation mode when changing the target temperature according to the third embodiment (part 3)

A third of embodiment of this disclosure is described referring to FIG. 8 to FIG. 10. In the third embodiment the operation mode when other period border lines and facing target temperatures lines are nearby when dragging, is described herein. Note, the operation mode for the period border lines K1 to K4 and the target temperature lines LC1 to LC5 and LH1 to LH5 are the same as the operation mode described in first embodiment, therefore the detailed description is omitted herein.

<Operation Mode 1>

As shown in FIG. 8, the regions RC1 to RC5 showing the cooling operation regions, that are the periods where the cooling operation is performed, are surrounded by the period border lines K1 to K4 and the cooling target temperatures MC1 to MC5 that show the surrounding cooling target temperature lines LC1 to LC5 that are the target temperature lines. In contrast, the regions RH1 to RH5 showing the heating operation regions, that are the periods where the heating operation is performed, are surrounded by the period border lines K1 to K4 and the heating target temperatures MH1 to MH5 that show the heating target temperature lines LH1 to LH5 that are the target temperature lines. The cooling operation regions RC1 to RC5 and the heating operation regions RH1 to RH5 that operate the heating operation are shown facing each other.

In this case, among the cooling target temperature lines LC1 to LC5 and the heating target temperature lines LH1 to LH5, the line that is subjected to dragging in order to move the lines accordingly, for example, if the heating target temperature line LH4 that is shown by the arrow Y3 is moved upwards along the temperature axis, the operation apparatus 2 moves another facing cooling target temperature line LC4 to the adjacent position whilst keeping the minimum target temperature. Thereafter, if dragging of the heating target temperature line LH4 is continued (the first state determination unit) the heating target temperature line LH4 that is subjected to the move, and also the cooling target temperature line LC4 facing will also be shift (first linking controller). The process is operated by the first state determination unit 46 and the first linking controller of the controller 4.

In other words, when moving the heating target temperature line LH4 upwards in the direction of the temperature axis, the cooling target temperature line LC4 will also shift upwards. As is shown in FIG. 8, if the heating target temperature at 70 degrees Fahrenheit is changed to 76 degrees Fahrenheit, in turn the cooling target temperature MC4 is changed from 75 degrees Fahrenheit to 77 degrees Fahrenheit.

From this, for example, if there is a desire to decrease the temperature of the cooling operation, the lower limit will no longer be limited by the upper limit of the temperature, and therefore it is not necessary to repeat the operation.

<Operation Mode 2>

The operation mode 2, is different from the operation mode 1 in that the movement of the facing target temperature line is limited.

As shown in FIG. 9, the regions RC1 to RC5 showing the cooling operation regions, that are the periods where the cooling operation is performed, are surrounded by the period border lines K1 to K4 and the cooling target temperatures MC to MC5 showing the surrounding cooling target temperature lines LC1 to LC5 that is the target temperature. In contrast, the regions RH1 to RH5, showing the heating operation regions, that are the periods where the heating operation is performed, are surrounded by the period border lines K1 to K4 and the heating target temperatures MH1 to MH5 that are showing the heating target temperature lines LH1 to LH5 that is the target temperature. The cooling operation regions RC1 to RC5 and the heating operation regions that operates the heating operation RH1 to RH5 are shown facing each other.

In this case, among the respective cooling target temperature lines LC1 to LC5 and the respective heating target temperature lines LH1 to LH5, the line that is subjected to dragging in order to move the lines accordingly is limited from further movement. That is, for example, if the heating target temperature line LH4 that faces the cooling target temperature line LC4 is moved to an adjacent position keeping the minimum temperature, as described above, when the dragging of the heating target temperature LH4 is continued thereafter (the first state determination unit) the target temperature line that is subjected to moving is limited from further movement (limitation control unit). The limitation process is assisted by the first state determination unit 46 and limitation control unit 48 of the controller.

That is, by moving the heating target temperature line LH4 upwards in the temperature axis direction, the minimum temperature range at 74 degrees Fahrenheit that has fallen below the cooling target temperature line LC4, will become the upper limit for movability of the heating target temperature line LH4. Thus, for example, when the upper limit of the heating operation is increased, the lower limit of the cooling operation will not be erroneously changed, and even if the room temperature is high the possibility of the cooling operation not performing can be prevented.

In this case, for third embodiment, it can be shown visually to the user that further movement is limited by a display mode using a pop-up display PT, such as, a flickering dotted line. From this, it can be made known to the user that limitation is due to an upper limit and not due to a malfunction of the apparatus 2. Additionally, in this case, if the user desires to increase the temperature, a facility to lift the limitation by the user is also provided.

<Operation Mode 3>

In the operation mode 3 the operation mode for the period border line will be described.

As shown in FIG. 10, for example, if the period border line K1 is subjected to dragging so as to move the period border line therein, the period border line K1 is moved to the adjacent position whilst keeping the pre-determined fixed minimum time interval (15 minutes for the third embodiment) of the period border line K2. Thereafter, if the dragging of the period border line K1 is continued (the second state determination) in addition to the period border line K1 subjected to move, the adjacent period border line K2 will also be moved (the second interlocking control). This process is operated by the second state determination unit 49 and the second linking controller 50 of the controller.

Specifically, if before changing the period border line K1 the time is 6:00, when changing the time to 10:00 as shown with the arrow X3, if the user moves the period border line K1 in the right direction of the diagram along the time axis, and, for example, the period border line K2 time is 9:00 before the change, the operation apparatus 2 will move the period border line K2 to the time 10:15 position with the moving of the period border line K1.

As a result, for example, if there is a desire to change a particular period, the movement of the period border line will no longer be limited by other period border lines when dragging to move therein. Thus, if there is a desire to change a particular period, it is not necessary to change the adjacent period before hand, and the repeating of an operation is minimized and the usability improved.

In this case, for instance, if we assume there are 3 period border lines K1, K2 and K3, respectively, by moving the middle period border line K2 in the direction of another period border line such as K3, in turn the period border line K3 is also shifted. Thereafter, in moving the period border line K2, for example, in the opposite direction, the other period border line K1 is shifted and therefore a plurality of periods can be changed by a single drag.

Any of the foregoing operation mode 1 to 3 can be selected and carried out solely or two or more operation modes selected arbitrarily can be performed together in a combined manner.

Other Embodiments

The present invention is not limited to the exemplary configurations described in the respective embodiments, it can be optionally modified or expanded without departing from the scope of the invention.

Figure 11:
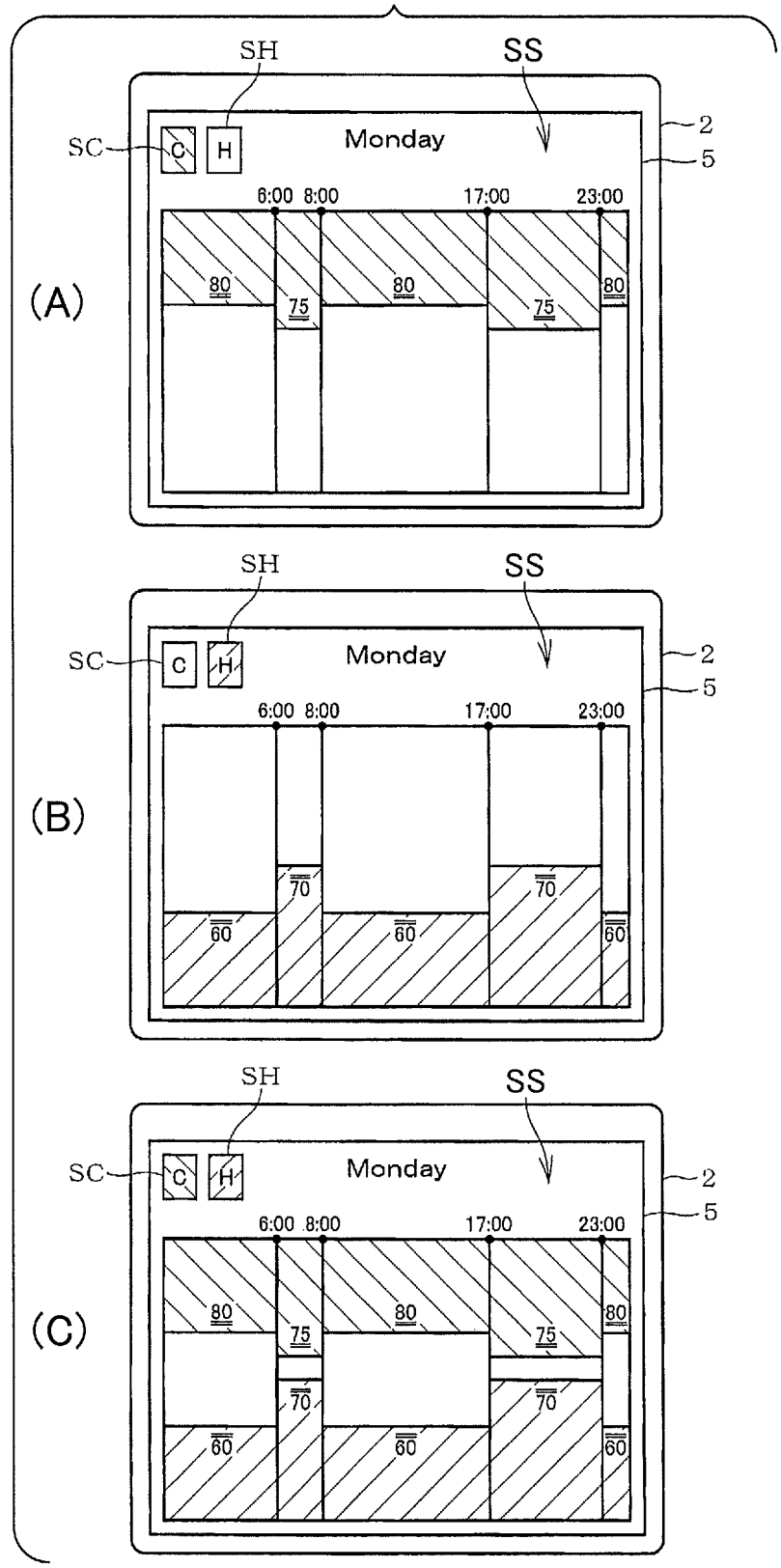
FIG. 11 is a schematic diagram of the operation mode when selecting cooling temperature settings and heating temperature settings according to the other embodiments.

In each of the respective embodiments described herein, the cooling regions (RC1 to RC5) and the heating regions (RH1 to RH5) are shown together, however these regions can be shown individually. In the case, the screen of the display unit can be configured to show one of the settings and as shown in FIG. 11 the selection button SC displaying the cooling operation regions and the selection button SH showing the heating operation can be arranged such that, for example, as shown in FIG. 11-(A) when the button SC is operated, that is, if the SC button is selected to show only the cooling operation regions, then accordingly only the cooling operation regions can be displayed. In contrast, as shown in FIG. 11-(B) if the selection button SH showing the heating regions is operated, then only the heating regions can be displayed. Additionally, as shown in FIG. 11 (C) of course if both the selection button SC and the selection button SH are operated and it is preferred to show both the cooling regions and heating regions, then both of the regions can be displayed.

Figure 12:
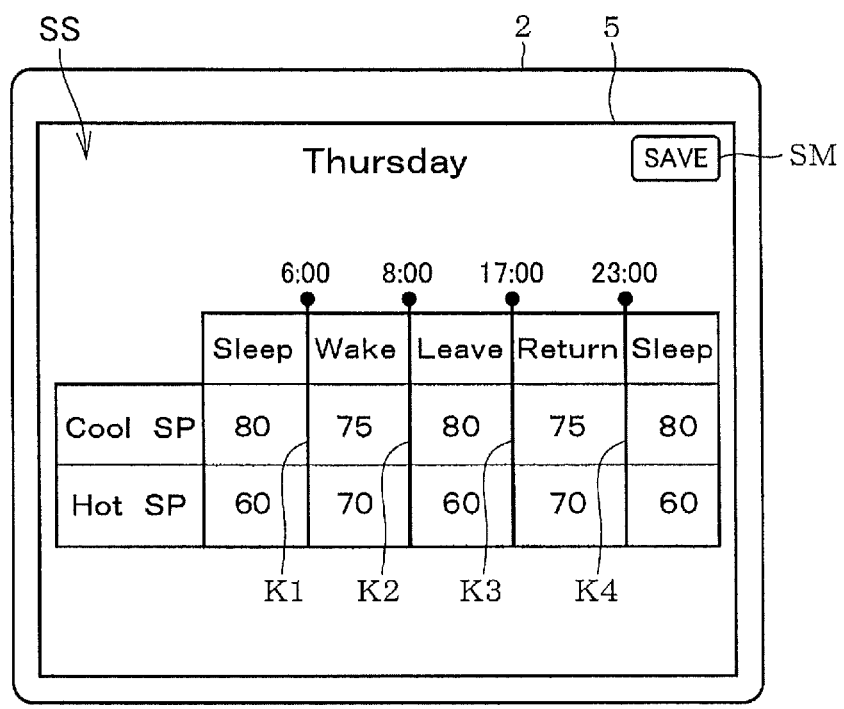
FIG. 12 is a schematic diagram of the display mode when a period is changed according to the other embodiments.

Also as shown in FIG. 12, the configuration can be such that the period border lines K1 to K4 are positioned in relation to the periods and target temperatures positioned in a matrix form, as explained previously in the embodiments. As a result, for the operation apparatus that is employed with a matrix-type setting, even if making a large change to the interface cannot be avoided by adapting according to the present disclosure it is unnecessary to carry out repeated controls in changing the period and a simple operation mode can be provided.

In each of the respective embodiments, the control mark MP is shown as a black circle in the diagram representing the identification display, and the control bar MB is shown as a double line, however the configuration can include a triangular figure (moving in) an upper direction, lower direction, left direction and right direction, and the period border lines K1 to K4 and the target temperature lines LC1 to LC5 and LH1 to LH5 can perform flickering therein.

Also in each of the respective embodiments, the control mark MP is positioned to overlap the upper frame part of the display frame W, however this position may be moved above or below the display frame W. In this way, when touching the control mark MP to change the target temperature, the possibility of erroneously controlling the period border lines K1 to K4 can be reduced.

The figures values in each of the respective embodiments are examples and not limited to the figure values that are shown therein.

Figure 13:
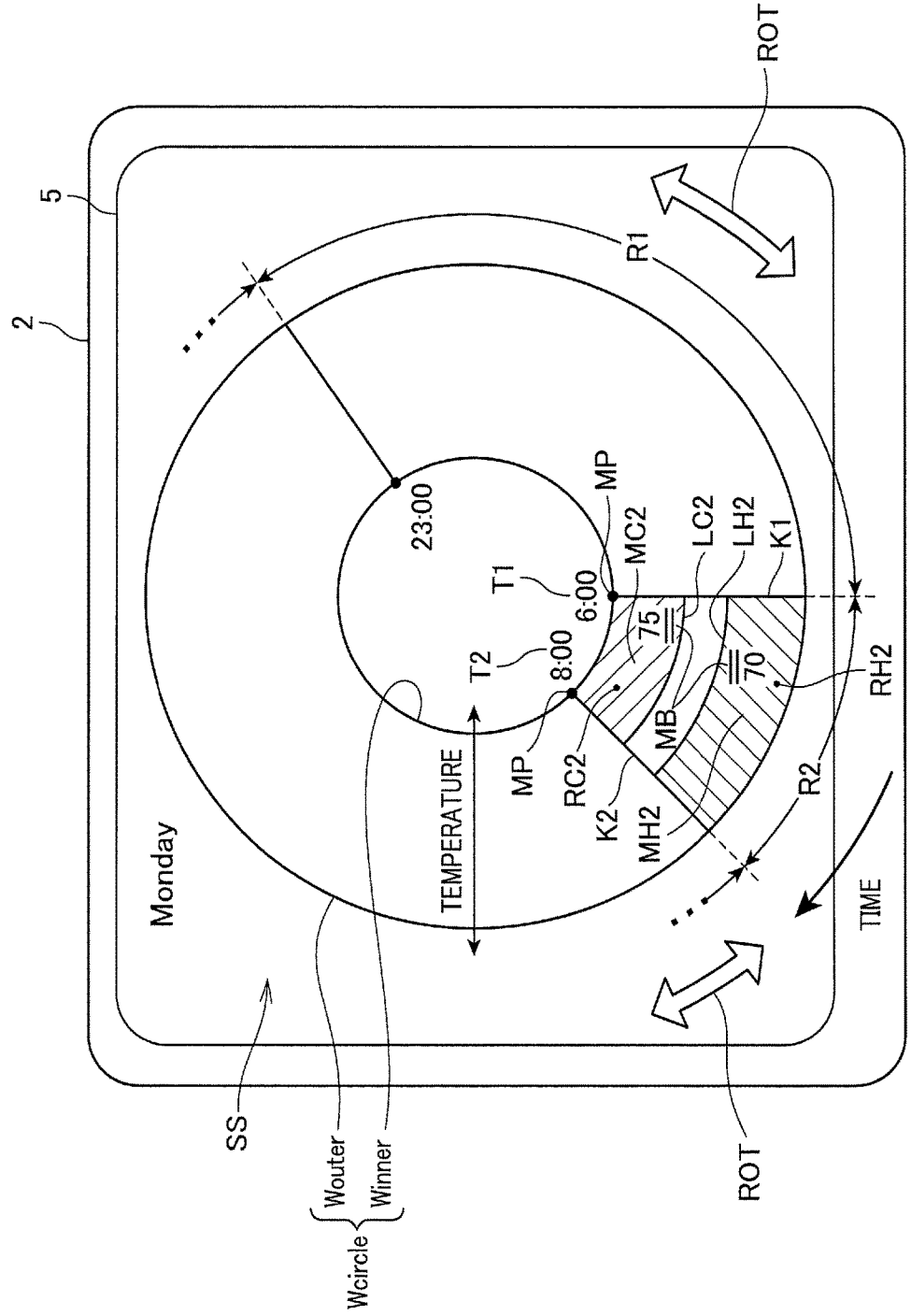
FIG. 13 is a schematic diagram of an example of a setting screen for the operation apparatus associated with the other embodiments.

Furthermore, in FIG. 13 a setting screen for the operation apparatus according to other embodiments is shown. In the previous embodiments described and modified examples, a rectangular display frame W for the setting screen SS of the display unit 5 is also shown, where the horizontal direction is set as the time axis, and the vertical direction is set as the temperature axis. However, it is not essential for the display frame to be shaped rectangular, it can also be a circular shape as shown in FIG. 13.

In FIG. 13, a double circled shape made of an outer circle W outer and an inner circle Winner is shown. In this display frame W circle, the display frame circular direction is the time axis and the radial direction is the temperature axis. That is, as shown in FIG. 2, both ends of the horizontal axis of the rectangle are joined together to form a cylinder shape. Therefore, if the desired time in a day is, for example 24 h, a circular type graphic user interface where the times 24:00 and 0:00 are overlapped is provided. For the setting display SS, each of the respective regions, for example, the sleeping period R1, is positioned to form the circular region, however, the setting screen can be configured according to the setting screen shown in FIG. 2. In the setting screen SS shown in FIG. 13, when dragging the period border lines and temperatures lines, a marker ROT is formed in the display frame W circle to turn the circle to a desired angle. Thus, if the user controls the marker ROT by flicking, the controller 4 will detect this operation and the screen will be able to be turned in correspondence with the operation volume and therefore control the direction of the whole of the display frame W circle. As a result, the desired period within the display frame W circle can be easily operated, and the display conditions can be selected such that the letters are displayed upwards and not upside down. In FIG. 13, according to the display frame W circle, a graphic interface with an arbitrary sense of time can be provided.

In FIG. 13, in order to perform the operation easily using a finger, the control mark MP is not the internal circumference W inner, but positioned on the top of the outer circumference W outer, and the axial pitch direction representing the temperature can be arranged oppositely from that shown in the diagram. In addition, the circular formed W circle can be substituted with an inner and outer circumference that is for example a polygon.

In the diagrams, 2 is the operation apparatus, 3 is the air conditioner, 4 is the controller, 5 is the display unit, 6 is the touch panel, K1 to K4 are the period border lines, K3G and LH3G are the virtual lines, MC1 to MC5 are the cooling target temperatures (target temperatures), MH1 to MH5 are the heating target temperatures (target temperature lines), R1 and R5 are the sleeping periods (period), and R2 is the rising time (period), R3 sleeping (period) R3 is the absent period (period), R4 is the present period (period) RC1 to RC5 are the cooling operation regions, RH1 to RH5 are the heating operation regions, and SS is the setting frame (graphic user interface).

What is claimed is:

1. An operation apparatus for an air conditioner, comprising:
    a display,
    a touch panel arranged on the display, the touch panel having a screen; and
    a controller controlling the screen in response to a control inputted into the touch panel,
    wherein the controller is configured to:
        display on the screen (i) a target temperature which is set for each period among a plurality of time periods formed by dividing one day, the one day being defined as a user's desired time period, (ii) a plurality of period border lines dividing the one day, the period border lines being movable by a user's dragging operation in a predetermined direction on the screen, and (iii) a control mark assigned to the plurality of period border lines and provided to visually identify that the period border lines are movable and to show a position at which the user's dragging operation is performed to move each of the period border lines;
        simultaneously change a start time and a stop time of mutually adjacent periods among the plurality of time periods, by dragging a designated period border line among the period border lines to move on the screen; and
        automatically reset the target temperature which has been set to the period before the start time and the stop has been changed, for the period after the change;
        display a target temperature line which is a dividing line segment showing the set target temperature for each of the periods, which is movable in an orthogonal direction from the period border line on the display; and
        change the target temperature by dragging the target temperature line to move therein, and as a result, the target temperature for a period corresponding to the target temperature line which is moved is thus changed.

2. The operation apparatus for the air conditioner according to claim 1 wherein the controller is further configured to provide an identification display visually showing the user that the period border line and the target temperature line subjected to dragging are movable therein.

3. The operation apparatus for the air conditioner according to claim 1, wherein the controller is further configured to display a virtual line to compare a position after moving and a position before moving by dragging a line therein for at least one of the period border line and the target temperature line.

4. The operation apparatus for the air conditioner according to claim 1, wherein:
    the controller is further configured to display the target temperature that is set for each period in a region surrounded by the period border line and the target temperature line; and the region is shaded in a different color than the background color of a setting screen of the display.

5. The operation apparatus for the air conditioner according to claim 1, wherein the controller is further configured to:
   determine a state where the designated period border line is moved toward an adjacent position positioned neighboring an adjacent period border line among the period border lines, the adjacent position being kept away by a predetermined fixed minimum range from the adjacent period border line during the dragging operation, and
   when the state is determined, move the adjacent period border line, during which the adjacent period border line is also moved to have at least the predetermined fixed minimum range kept between the moved designated period border line and the moved adjacent period border line.

6. The operation apparatus for the air conditioner according to claim 1, wherein,
   in each period of the display on the screen,
   a target temperature is set for a cooling operation and a heating operation,
   the target temperature is a threshold value to start the cooling operation, and a cooling target temperature is the target temperature for the cooling operation; and
   the target temperature is a threshold value to start the heating operation, and a heating target temperature is the target temperature for the heating operation,
   the controller is further configured to reset both the cooling target temperature and the heating target temperature for a period after a change in the case where the period is changed by dragging the period border line to change therein, the period border is common for both the cooling operation and the heating operation.

7. The operation apparatus for the air conditioning according to claim 6 wherein the controller is further configured to:
   display a cooling region that shows a region surrounded by a cooling target temperature line which is the target temperature line showing the cooling target temperature and the period border line;
   display a heating region that shows a region surrounded by a heating target temperature line which is the target temperature line showing the heating target temperature and the period border line;
   the cooling region and the heating region being positioned facing each other therein;
   determine a state when among the cooling target temperature lines and the heating target temperature lines the target temperature line subjected to dragging to moves therein, moves to the adjacent position keeping the pre-determined minimum temperature range of other facing target temperature line, where dragging is continued thereafter; and
   in the case of the temperature determination determining the state, move the target temperature line subjected to the move and the other target temperature lines.

8. The operation apparatus for the air conditioner according to claim 6 wherein the controller is further configured to:
   display a cooling region shown as a region surrounded by a cooling target temperature line, that is, the target temperature line showing the cooling target temperature, and the period border line; and
   display a heating region shown as a region surrounded by a heating target temperature line, that is, the target temperature line showing the heating target temperature, and the period border line,
   wherein, the cooling region and the heating region are positioned facing each other therein,
   the controller is further configured to:
   determine a state when among the cooling target temperature lines and the heating target temperature lines the target temperature line subjected to dragging to moves to the adjacent position keeping the pre-determined minimum temperature range of other facing target temperature line, where dragging is continued thereafter, and
   limit further movement of the target temperature line subjected to moving, when the temperature determination determines the state therein.

9. A method for operating an operation apparatus for an air conditioner, wherein the operation apparatus comprises:
   a display,
   a touch panel corresponding to the display, the touch panel having a screen, and
   a controller,
   the method comprising:
   displaying, by processes performed in the controller, on the screen i) a target temperature which is set for each period among a plurality of time periods formed by dividing one day into a plurality of periods, the one day being defined as a user's desired time period, ii) a plurality of period border lines dividing the one day, the period border lines being movable by a user's dragging operation in a predetermined direction on the display, and iii) a control mark assigned to the plurality of period border lines and provided to visually identify that the period border lines are movable and to show a position at which the user's dragging operation is performed to move each of the period border lines,
   simultaneously changing, by processes performed in the controller, a start time and a stop time of mutually adjacent periods among the plurality of periods, by dragging a designated period border line among the period border line lines to move on the screen;
   automatically resetting, by processes performed in the controller, the target temperature which has been set to the period before the start time and the stop time has been changed, for the period after the change;
   display a target temperature line which is a dividing line segment showing the set target temperature for each of the periods, which is movable in an orthogonal direction from the period border line on the display; and
   change the target temperature by dragging the target temperature line to move therein, and as a result, the target temperature for a period corresponding to the target temperature line which is moved is thus changed.

10. The method according to claim 9, comprising:
    determining, by processes performed in the controller, a state where the designated period border line is moved toward an adjacent position positioned neighboring an adjacent period border line among the period border lines, the adjacent position being kept away by a predetermined fixed minimum range from the adjacent period border line during the dragging operation; and
    when the state is determined, moving, by the controller, the adjacent period border line, during which the adjacent period border line is also moved to have at least the predetermined fixed minimum range kept between the moved designated period border line and the moved adjacent period border line.

* * * * *

UNITED STATES PATENT AND TRADEMARK OFFICE
CERTIFICATE OF CORRECTION

PATENT NO. : 10,473,347 B2
APPLICATION NO. : 14/715163
DATED : November 12, 2019
INVENTOR(S) : Wataru Sugiyama Page 1 of 1

It is certified that error appears in the above-identified patent and that said Letters Patent is hereby corrected as shown below:

On the Title Page

Item (54) and in the Specification, Column 1, Lines 1-4, "METHOD AND APPARATUS FOR COMMANDING TEMPERATURES TARGETED BY AIR CONDITIONER" should be changed to - -METHOD AND APPARATUS FOR COMMANDING TARGET TEMPERATURES FOR AIR CONDITIONER--

Signed and Sealed this
Fourteenth Day of January, 2020

Andrei Iancu
*Director of the United States Patent and Trademark Office*